(12) United States Patent
Tsirogiannis et al.

(10) Patent No.: US 9,053,003 B2
(45) Date of Patent: Jun. 9, 2015

(54) MEMORY COMPACTION MECHANISM FOR MAIN MEMORY DATABASES

(75) Inventors: Dimitrios Tsirogiannis, Madison, WI (US); Per-Ake Larson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 333 days.

(21) Appl. No.: 13/529,865

(22) Filed: Jun. 21, 2012

(65) Prior Publication Data

US 2013/0346378 A1  Dec. 26, 2013

(51) Int. Cl.
| | | |
|---|---|---|
| G06F 7/00 | (2006.01) |
| G06F 17/00 | (2006.01) |
| G06F 17/30 | (2006.01) |
| G06F 12/02 | (2006.01) |
| G06F 12/08 | (2006.01) |

(52) U.S. Cl.
CPC .......... *G06F 12/023* (2013.01); *G06F 12/0269* (2013.01); *G06F 12/08* (2013.01); *G06F 2212/163* (2013.01); *G06F 17/30306* (2013.01)

(58) Field of Classification Search
CPC ................................................ G06F 17/30306
See application file for complete search history.

(56) References Cited

U.S. PATENT DOCUMENTS

| | | | |
|---|---|---|---|
| 5,263,155 A * | 11/1993 | Wang ............................ 707/695 |
| 5,577,246 A | 11/1996 | Priddy et al. |
| 5,699,539 A * | 12/1997 | Garber et al. ..................... 711/2 |
| 5,857,210 A | 1/1999 | Tremblay et al. |
| 5,893,117 A * | 4/1999 | Wang ..................................... 1/1 |
| 5,949,972 A * | 9/1999 | Applegate ....................... 714/54 |
| 6,865,657 B1 | 3/2005 | Traversat et al. |
| 7,181,574 B1 | 2/2007 | Lele |
| 2006/0155791 A1 | 7/2006 | Tene et al. |
| 2008/0021934 A1* | 1/2008 | Hudson et al. ................ 707/203 |
| 2009/0024562 A1 | 1/2009 | Lee et al. |
| 2009/0327621 A1 | 12/2009 | Kliot et al. |
| 2010/0223432 A1 | 9/2010 | Eidus et al. |
| 2011/0107338 A1 | 5/2011 | Ylonen |
| 2011/0307828 A1 | 12/2011 | Chilimbi et al. |
| 2012/0102006 A1* | 4/2012 | Larson et al. ................. 707/703 |

OTHER PUBLICATIONS

"International Search Report & Written Opinion for PCT Patent Application No. PCT/US2013/045749", Mailed Date: Oct. 9, 2013, Filed Date: Jun. 13, 2013, 6 Pages.

(Continued)

*Primary Examiner* — Susan Chen
(74) *Attorney, Agent, or Firm* — Henry Gabryjelski; Raghu Chinagudabha; Micky Minhas

(57) ABSTRACT

The present invention extends to methods, systems, and computer program products for performing memory compaction in a main memory database. The main memory database stores records within pages which are organized in doubly linked lists within partition heaps. The memory compaction process uses quasi-updates to move records from a page to the emptied to an active page in a partition heap. The quasi-updates create a new version of the record in the active page, the new version having the same data contents as the old version of the record. The creation of the new version can be performed using a transaction that employs wait for dependencies to allow the old version of the record to be read while the transaction is creating the new version thereby minimizing the effect of the memory compaction process on other transactions in the main memory database.

20 Claims, 8 Drawing Sheets

(56) References Cited

OTHER PUBLICATIONS

Lim, et al., "A Memory-Efficient Real-Time Non-Copying Garbage Collector", In Proceedings of the 1st International Symposium on Memory Management, 1998, pp. 118-129.

Schatz, "Incremental Garbage Collection II", In Seminar aus Softwareentwicklung: Garbage Collection, 2006, pp. 1-16. http://www.ssw.jku.at/Teaching/Lectures/Sem/2005/Reports/Schatz.pdf.

Sundell. et al., "Lock-Free Deques and Doubly Linked Lists," J. Parallel Distributed Computing, (68) 2008. pp. 1008-1020.

Gidenstam, et al., "Efficient and Reliable Lock-Free Memory Reclamation Based on Reference Counting," IEEE Transactions on Parallel and Distributed Systems, vol. 20, No. 8, Aug. 2009.

\* cited by examiner

MEMORY COMPACTION MECHANISM FOR MAIN MEMORY DATABASES

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Many computer systems employ databases to store data. One type of database, known as a main memory database or in-memory database, is stored in main memory. In other words, the tables of the main memory database are stored entirely in main memory as opposed to being stored on disk or other types of secondary storage. Because memory is a limited and valuable resource in a computer system, it is important to utilize the memory in the most efficient manner possible.

One problem that arises when implementing a main memory database is memory fragmentation. FIG. 1 illustrates how memory fragmentation can occur in a main memory database. FIG. 1 shows a memory 100 that contains various pages 101a-101d. In general, a page is a portion of memory that has been allocated for the storage of database records. On the left side of FIG. 1, these pages are shown as being full meaning that each page contains the maximum number of records, and these records are valid. The left side accordingly represents efficient memory utilization by the database.

In contrast, on the right side of FIG. 1, pages 101a-101d are shown as being nearly empty. Specifically, each page is shown as containing few valid records. Nearly empty pages do not efficiently utilize memory because only a small portion of the allocated size of the page is used to store valid data (and because the page stores at least one valid record, the page cannot be reclaimed for subsequent use). Pages 101a-101d can become nearly empty in various ways such as when records in a page are deleted.

When pages of a main memory database are not efficiently utilized, the main memory database's performance can suffer. For example, poor memory utilization can cause the database to occupy more memory than necessary thus limiting the size of database that can be effectively implemented as a main memory database.

BRIEF SUMMARY

The present invention extends to methods, systems, and computer program products for implementing memory compaction in main memory databases. Memory compaction refers to the relocation of records from a page with poor space utilization to another page thereby "compacting" records into fewer pages. In this way, pages with poor space utilization (i.e. pages containing relatively few valid records) can be emptied to allow the pages to be reclaimed for other uses.

A main memory database according to the present invention can structure records within pages that are organized as a doubly linked list within a partition heap. A main memory database can include many partition heaps. Memory compaction can be performed on a partition heap by moving records from one page to an active page of the partition heap to thereby empty all valid records from the page. Moving a record can comprise performing a quasi-update on the record. A quasi-update refers to the fact that a new version of the record is created in the active page, but the new version contains the same user data as the old version.

According to one embodiment of the invention, memory compaction can be performed by scanning a doubly linked list of pages in memory. The pages store records of the main memory database. The scanning comprises determining memory utilization of each page. Based on the memory utilization of each page, it is determined which pages have a memory utilization below a specified threshold. For each page having a memory utilization below the threshold, the memory compaction process is performed by: (1) identifying each valid record in the page; (2) for each valid record, creating a new version of the record in an active page; (3) for each valid record for which a new version is created, marking the valid record as invalid; and (4) after each valid record in the page is marked as invalid, the page is removed from the doubly linked list by a garbage collector.

According to another embodiment, a memory compaction thread determines that memory compaction should be performed on at least one of the partition heaps of a main memory database. The memory compaction thread creates a work item containing instructions for performing memory compaction on a partition heap. The memory compaction thread pushes the work item into a queue pertaining to a worker thread that performs memory compaction on the partition heap.

The worker thread accesses the work item in the queue to determine that the work item instructs the worker thread to perform memory compaction on the partition heap. The worker thread accesses a memory utilization value in a header of each page in the doubly linked list of pages in the partition heap. For each page having a memory utilization value below a threshold, the worker thread performs a memory compaction process: (1) to create a new version of each valid record in the page, the new version being created in an active page of the partition heap, and (2) to mark each valid record in the page for which a new version was created as invalid to thereby allow a garbage collector to subsequently empty the page of all records and reclaim the page for other uses.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
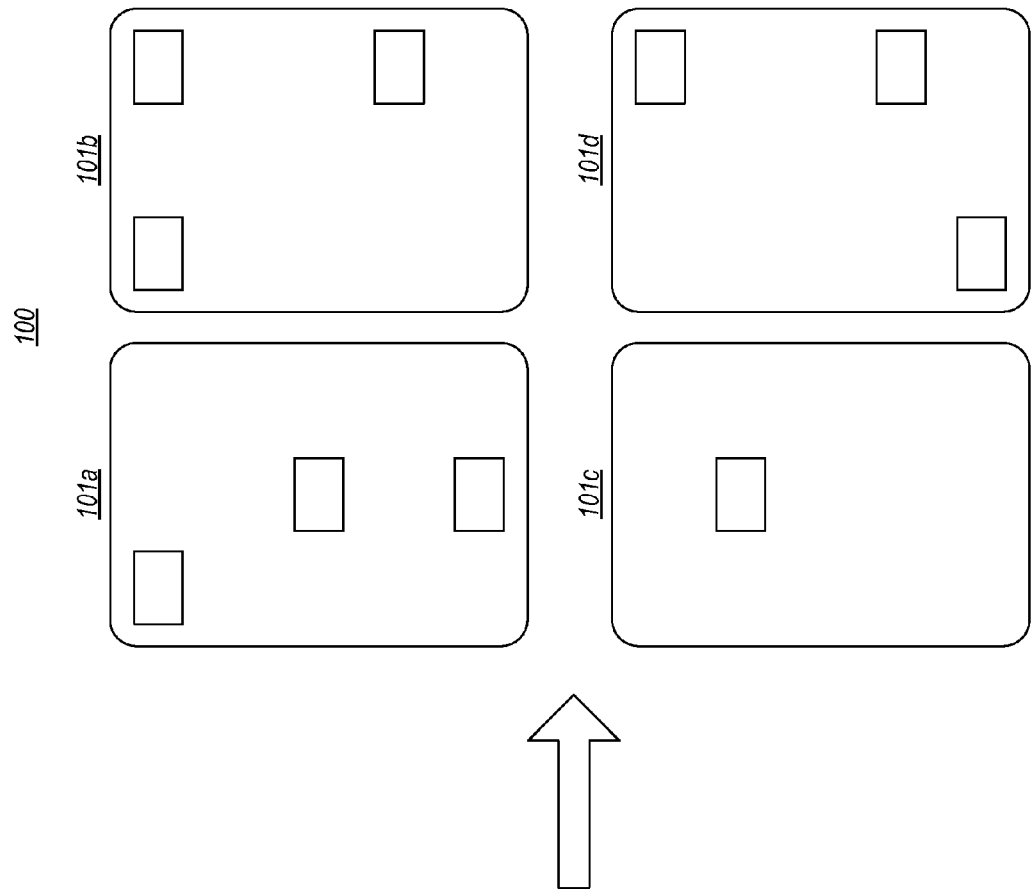
FIG. 1 illustrates an example of memory fragmentation.
Figure 1:
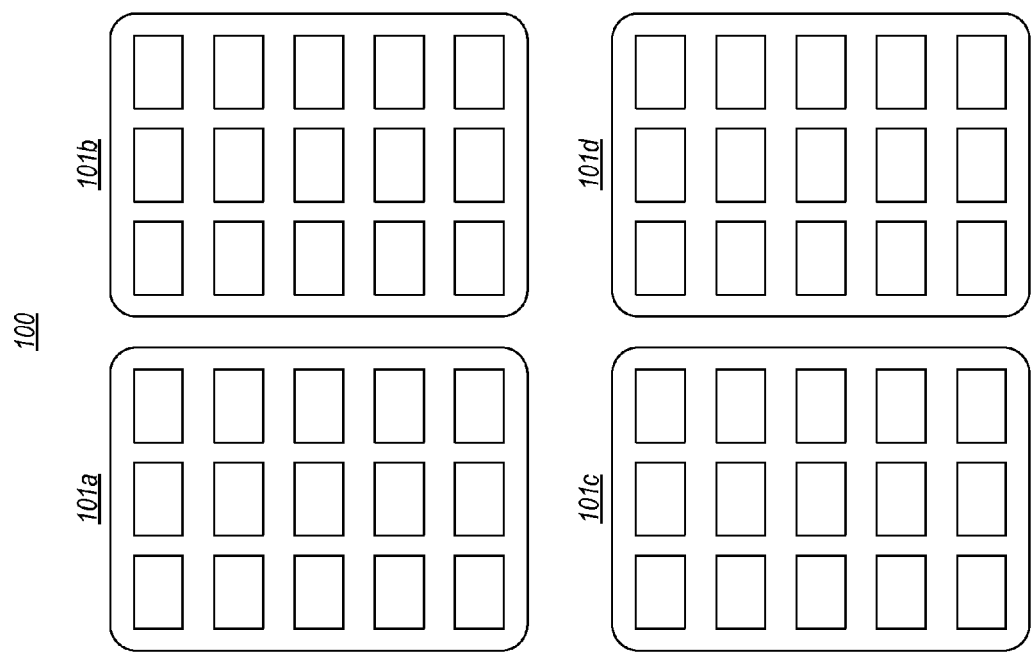

The present invention extends to methods, systems, and computer program products for implementing memory compaction in main memory databases. Memory compaction refers to the relocation of records from a page with poor space utilization to another page thereby "compacting" records into fewer pages. In this way, pages with poor space utilization (i.e. pages containing relatively few valid records) can be emptied to allow the pages to be reclaimed for other uses.

A main memory database according to the present invention can structure records within pages that are organized as a doubly linked list within a partition heap. A main memory database can include many partition heaps. Memory compaction can be performed on a partition heap by moving records from one page to an active page of the partition heap to thereby empty all valid records from the page. Moving a record can comprise performing a quasi-update on the record. A quasi-update refers to the fact that a new version of the record is created in the active page, but the new version contains the same user data as the old version.

According to one embodiment of the invention, memory compaction can be performed by scanning a doubly linked list of pages in memory. The pages store records of the main memory database. The scanning comprises determining memory utilization of each page. Based on the memory utilization of each page, it is determined which pages have a memory utilization below a specified threshold. For each page having a memory utilization below the threshold, the memory compaction process is performed by: (1) identifying each valid record in the page; (2) for each valid record, creating a new version of the record in an active page; (3) for each valid record for which a new version is created, marking the valid record as invalid; and (4) after each valid record in the page is marked as invalid, the page is removed from the doubly linked list by a garbage collector.

According to another embodiment, a memory compaction thread determines that memory compaction should be performed on at least one of the partition heaps of a main memory database. The memory compaction thread creates a work item containing instructions for performing memory compaction on a partition heap. The memory compaction thread pushes the work item into a queue pertaining to a worker thread that performs memory compaction on the partition heap.

The worker thread accesses the work item in the queue to determine that the work item instructs the worker thread to perform memory compaction on the partition heap. The worker thread accesses a memory utilization value in a header of each page in the doubly linked list of pages in the partition heap. For each page having a memory utilization value below a threshold, the worker thread performs a memory compaction process: (1) to create a new version of each valid record in the page, the new version being created in an active page of the partition heap, and (2) to mark each valid record in the page for which a new version was created as invalid to thereby allow a garbage collector to subsequently empty the page of all records and reclaim the page for other uses.

Exemplary Environments

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer. Accordingly, the claimed invention can be embodied as computer executable instructions stored on one or more computer storage devices.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

A particular example environment in which the invention can be implemented is a cloud environment. A cloud environment comprises a collection of interconnected computing components (e.g. a cluster of server computing systems). Accordingly, a main memory database according to the present invention can be stored and executed within main memory of a cloud environment.

Memory Compaction

Figure 2A:
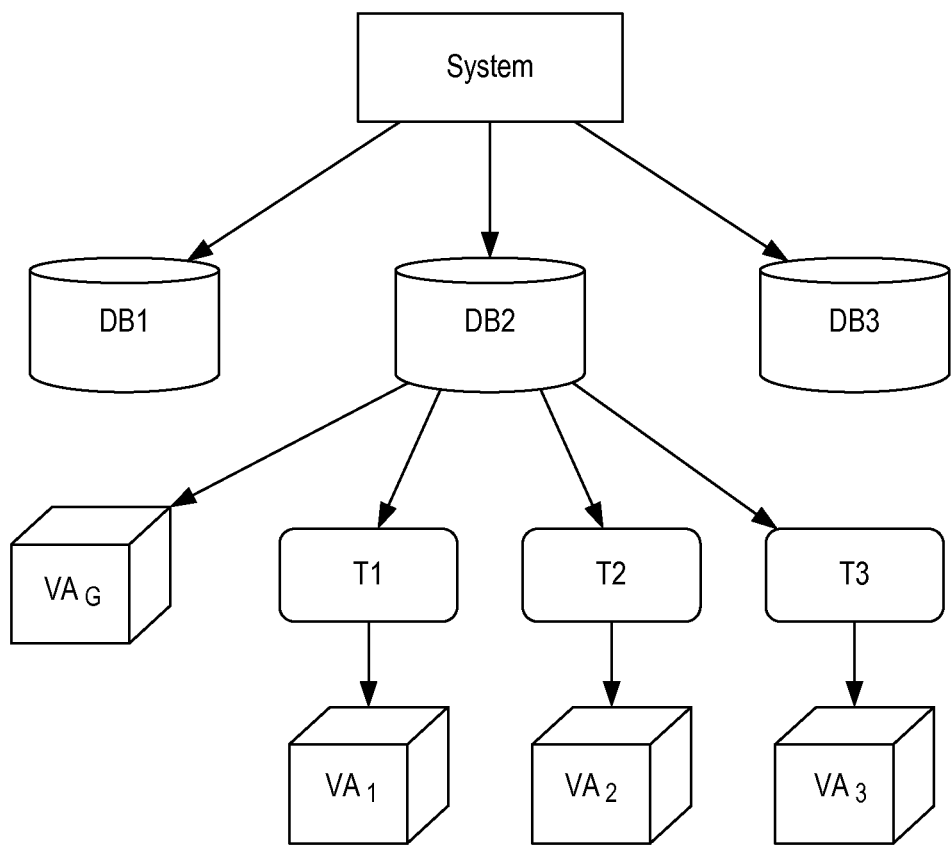
FIG. 2A illustrates an exemplary main memory database system.

FIG. 2A illustrates an exemplary structure of a main memory database system 200. System 200 can include any reasonable number of databases, but is shown as containing three in FIG. 2A (DB1, DB2, and DB3). For ease of illustration, only the tables in DB2 are shown. DB2 is shown as including three tables (T1, T2, and T3) that store fixed size records. Although not shown, DB2 can also include various tables for storing variable size records. A single memory allocator (VA1, VA2, and VA3 respectively) is used to manage memory allocation for each of the three tables. A fourth memory allocator (VAg) is used to manage memory allocation for any table that stores variable sized records (not shown) in DB2.

Memory management can be monitored at the memory allocator level. For example, for memory allocator VA1, the memory utilization of table T1 can be monitored to determine whether table T1 is exhibiting efficient memory utilization as will be further described below.

Figure 2B:
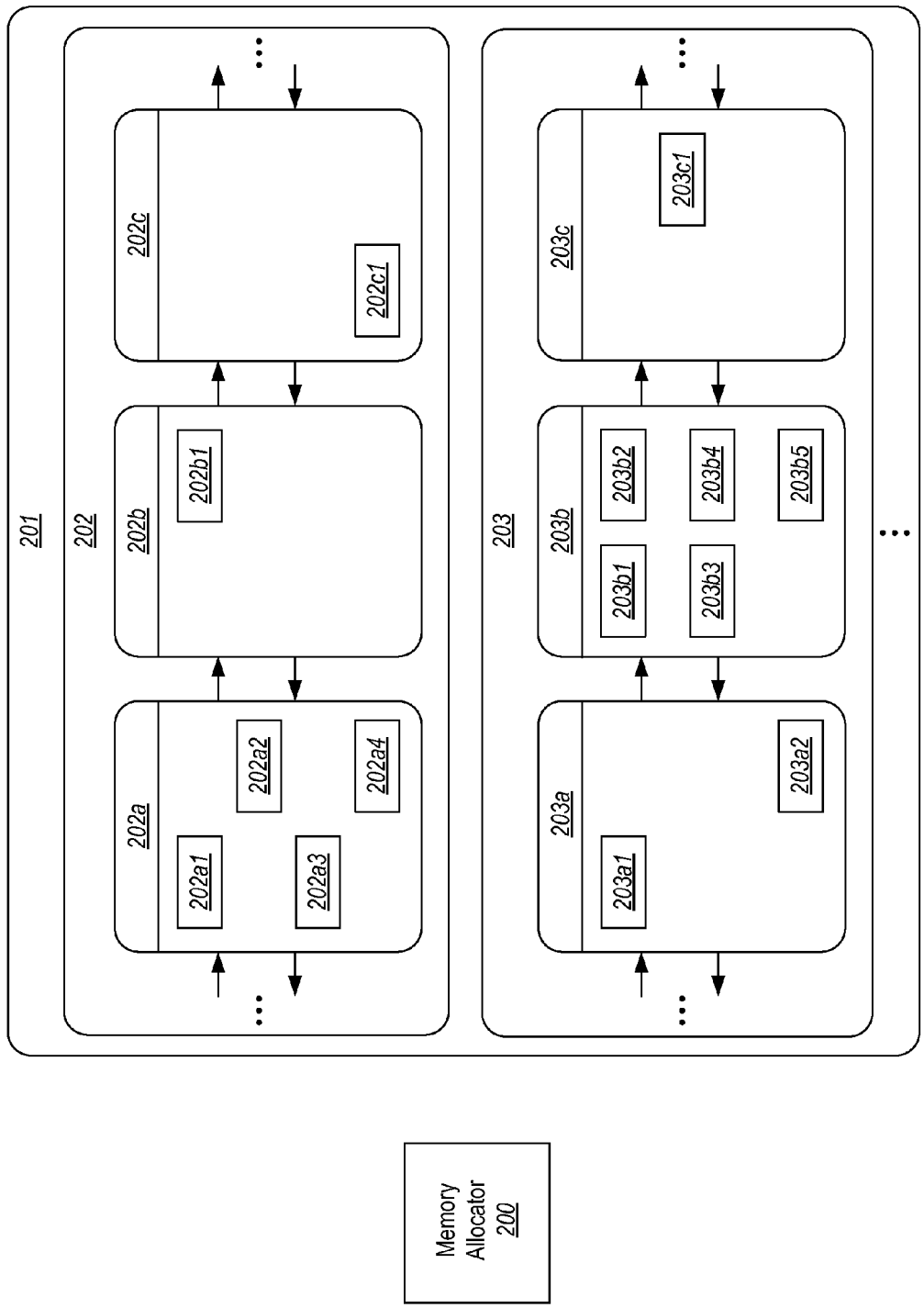
FIGS. 2B-2D illustrate an exemplary storage structure used in a main memory database.

FIG. 2B illustrates an exemplary storage structure for a table 201 of a main memory database. Table 201 can represent any of tables T1, T2, or T3 shown in FIG. 2A. The pages of memory used to store records of table 201 are arranged into various partition heaps including partition heaps 202 and 203 shown in FIG. 2B. The number of partition heaps used can vary and can be a configurable parameter.

In FIG. 2B, each of partition heaps 202 and 203 is shown as including a number of pages that are arranged in a doubly linked list as represented by the bi-directional arrows between each page. Although only three pages are shown in each partition heap, any reasonable number of pages may exist in a particular partition heap as represented by the ellipses.

There are several advantages to using a doubly linked list in the partition heap. First, page insertions and removals can occur at different positions in the list, thereby reducing contention and improving scalability during regular operations. These operations can be performed efficiently without requiring the list to be traversed from either end. Second, empty pages can be immediately removed from the list and released to the operating system. In contrast, when a stack data structure is used, empty pages have to appear at the top of the stack in order to be released to the operating system.

The doubly-linked list, in some embodiments, may be a lock-free data structure. Lock-free means that the data structure can be accessed (e.g., read or write access) without requiring a lock on the data structure. These types of locks are also often referred to as latches. It is noted that lock in this sense is different than the transactional lock (i.e. write lock) described below in the multi-version concurrency control scheme. A transactional lock is a lock on a record or group of records, as opposed to a lock (or latch) on the entire data structure. However, the doubly-linked list does not have to be implemented in a lock-free manner. Memory compaction can be implemented with a lock-based implementation of this data structure. However, lock-free may scale better and therefore be especially suited for in-memory databases.

Each page contains one or more records and includes a header. The header may store various types of information, but for purposes of this disclosure, the header includes an indication of the memory utilization of the page. For example, the header may indicate the number of records that are stored in the page. This indication can have various forms such as a specific number, a percentage, etc. This indication, as further described below, allows the identification of pages that exhibit low memory utilization and are therefore good candidates for memory compaction.

Figure 2C:
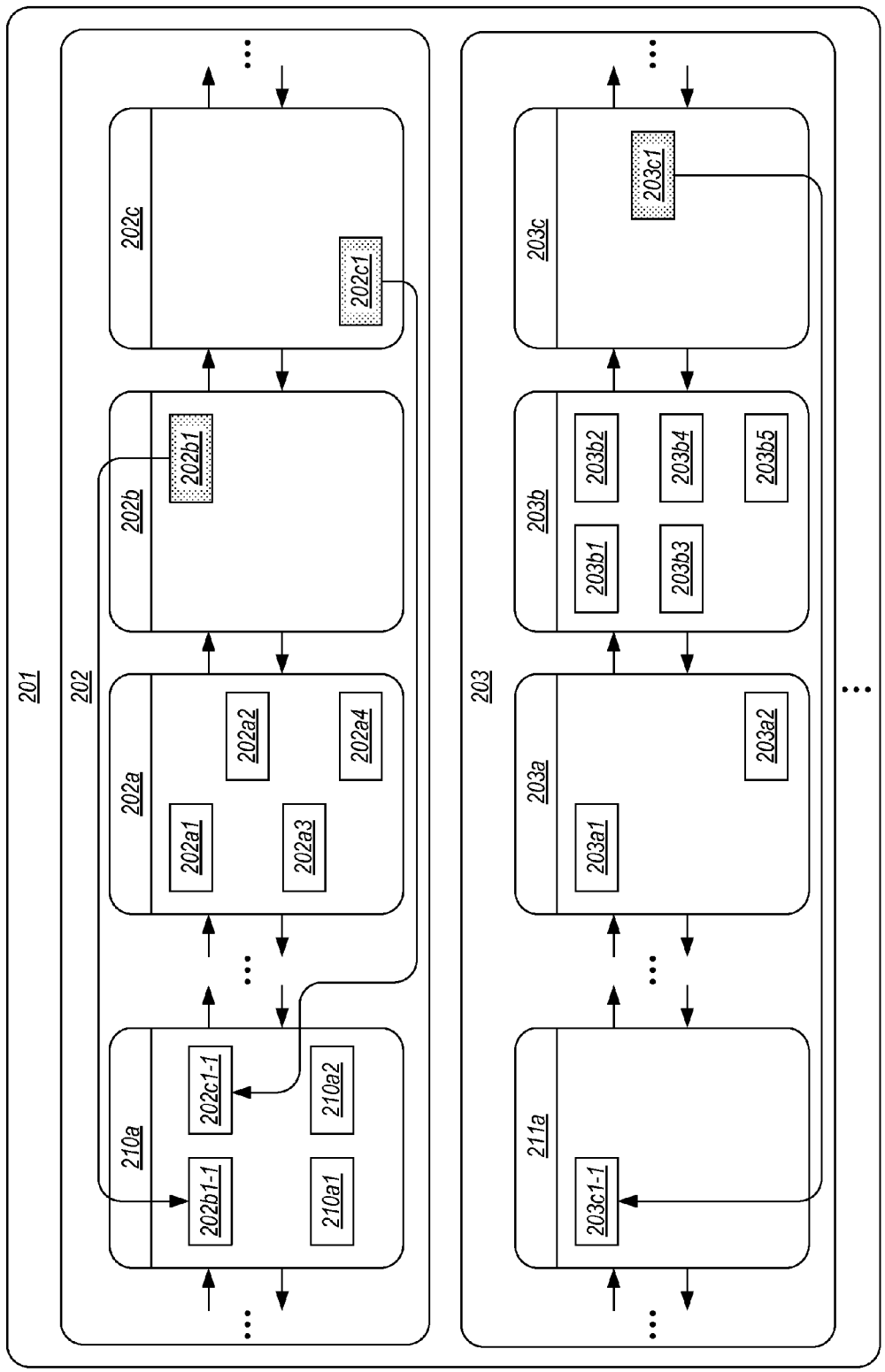

FIG. 2C illustrates table 201 of FIG. 2B with the addition of active pages 210a and 211a. In general, each partition heap includes an active page (i.e. the page of the partition heap to which new records are added). Active page 210a is the current page in partition heap 202 to which new records are added. Similarly, active page 211a is the current page in partition heap 203 to which new records are added.

Active page 210a is shown as already including two records, 210a1 and 210a2 which are records that have been newly added to table 201. Records 202b1-1 and 202c1-1 (which are new versions of records 202b1 and 202c respectively) are added to active page 210a according to the techniques of the present invention. Similarly, active page 211a is shown as not having included any records prior to the creation of record 203c1-1 (which is a new version of record 203c1).

As discussed above with respect to FIG. 2B, each page stores information that identifies the memory utilization of the page. Based on this information, a page can be identified for compaction. For example, pages exhibiting memory utilization below some threshold can be selected for memory compaction. In the example of FIG. 2C, the threshold is assumed to be two records (meaning that any page that stores fewer than two valid records will be subject to compaction). The memory utilization of pages 202b, 202c, and 203c each falls below this threshold. Accordingly, the records from each of these pages are shown as being relocated to the corresponding active page.

Specifically, according to the present invention, records $202b1$, $202c1$, and $203c1$ are "moved" from pages $202b$, $202c$, and $203c$ respectively into the corresponding active page. By "moved," what is meant is that a new version of each record is created in the appropriate active page. This moving comprises a quasi-update of the record because the user data content, often called the payload, of the record remains unchanged. Accordingly, the content of records $202b1\text{-}1$, $202c1\text{-}1$, and $203c1\text{-}1$ is the same as the content of records $202b1$, $202c1$, and $203c1$ in pages $202b$, $202c$, and $203c$ respectively.

Figure 2D:
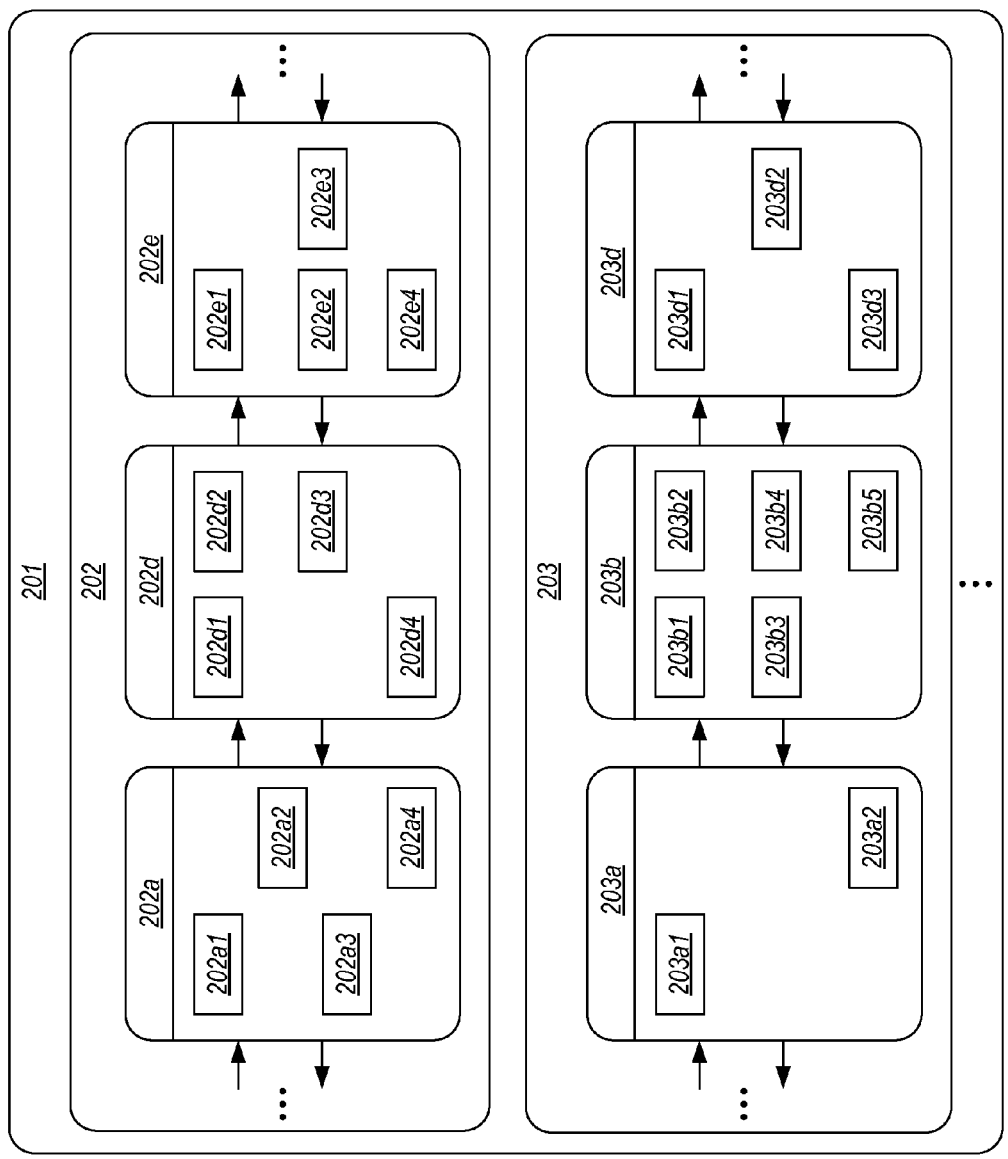

As will be further described below, records $202b1$, $202c1$, and $203c1$ thus become old versions of the record as indicated by the cross-hatching. The actual removal of invalid records is delayed until they are no longer visible to any active transaction. Once the garbage collector has removed all records from a page, the page can be released. FIG. 2D illustrates details of what happens to pages $202b$, $202c$, and $203c$ after this process of moving the records has occurred.

As shown in FIG. 2D, pages $202b$, $202c$, and $203c$ have been removed from their respective doubly linked lists with the partition heaps (active pages $210a$ and $211a$ are not shown for clarity). These pages are removed from the doubly linked list by a garbage collector agent updating the pointers in the doubly linked list (e.g. so that page $202a$ is linked to page $202d$ (the page to which now removed page $202c$ was linked on the right side)). Similarly, partition heap 203 is modified so that page $203d$ is linked to page $203b$ in the doubly linked list. It is noted that although a doubly linked list is used in this specific example, other data structures could be used. A doubly linked list, however, is a preferred structure because it facilitates the consolidation of the list of pages within a partition heap (i.e., the relinking of a page in both directions), and it allows an empty page to be freed at any time (as opposed to when the page is on the top of the stack when a stack storage structure is used).

The memory compaction process can be performed on a periodic basis (e.g. every x seconds), in response to a trigger (e.g. when an excess of pages with low memory utilization is detected), on demand (e.g. in response to user input or input from another process), etc. In some embodiments, statistics regarding the memory utilization of each memory allocator in the system can be maintained to allow the detection of memory allocators (i.e. the partition heaps pertaining to the memory allocator) that exhibit poor memory utilization.

Figure 3:
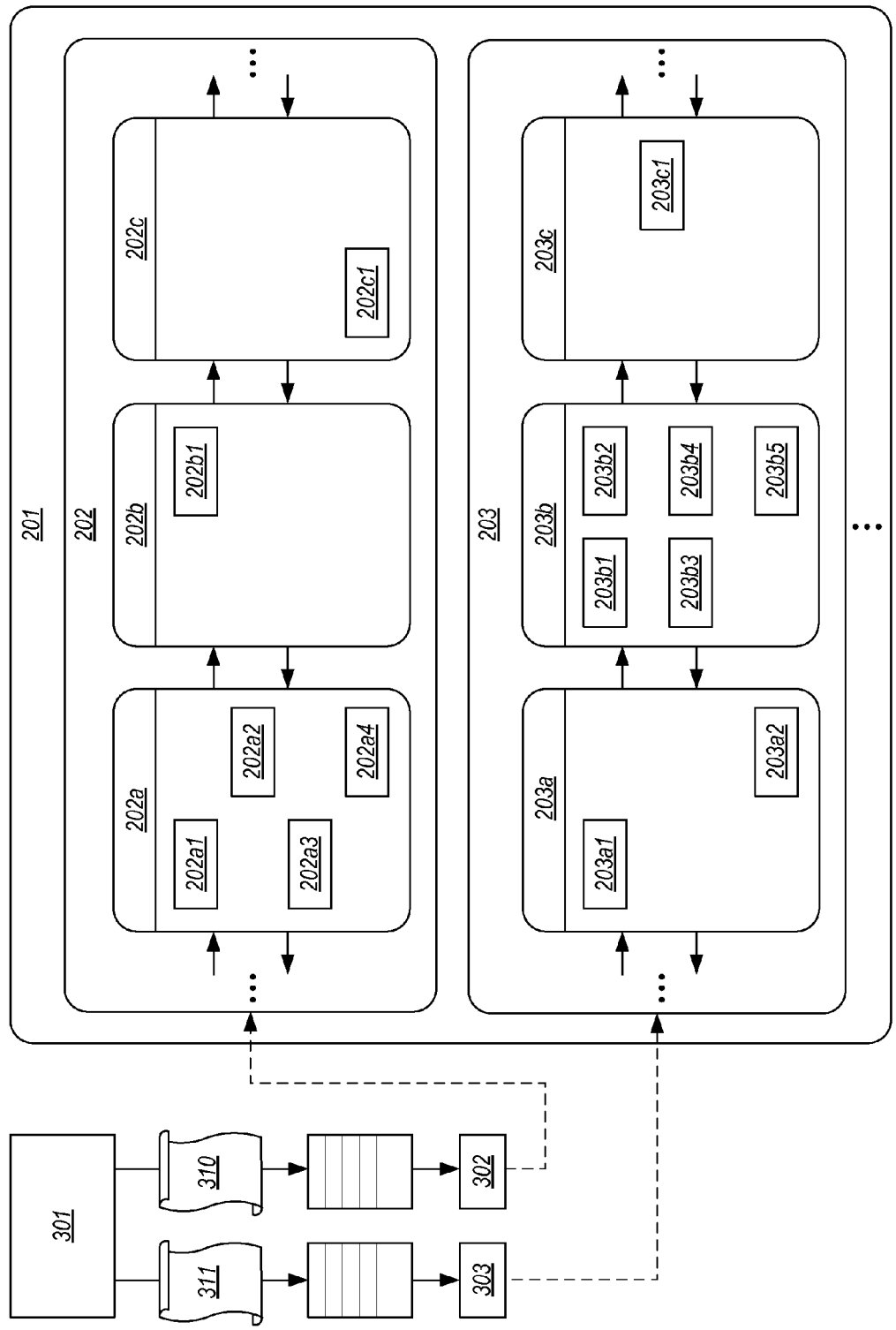
FIG. 3 illustrates various components for implementing memory compaction.

FIG. 3 illustrates various components that can be used to implement the processes described with respect to FIGS. 2B and 2C. FIG. 3 illustrates table 201 as it appears in FIG. 2B. FIG. 3 also includes various other components: a main thread 301 (referred to as the memory compaction (MC) thread), worker threads 302 and 303, queues $302a$ and $303a$, and work items 310 and 311.

MC thread 301 performs the detection process as described with respect to FIG. 2B. Specifically, MC thread 301 is configured to periodically or otherwise determine which memory allocators are exhibiting low memory utilization. As described above, this can be accomplished by accessing statistics that are stored regarding the memory utilization of a particular memory allocator (i.e. the memory utilization of the partition heaps that pertain to the memory allocator).

When MC thread 301 detects a memory allocator that exhibits low memory utilization, MC thread 301 can create one or more work items. In some embodiments, one work item can be created for each partition heap pertaining to the memory allocator. FIG. 3 explicitly shows one work item that has been created for each of partition heaps 202 and 203. Each work item comprises sufficient instructions to instruct a worker thread to perform the relocation of records on a particular partition heap.

In the example depicted in FIG. 3, work item 310 corresponds to partition heap 202 and work item 311 corresponds to partition heap 203. MC thread 301 inserts work items 310 and 311 in queues $302a$ and $303a$ respectively (i.e. each worker thread has a corresponding queue into which MC thread 301 inserts work items for the worker thread to process). Although two worker threads are shown in FIG. 3, a single worker thread could be assigned both work items 310 and 311.

For example, worker threads can be partitioned in various ways. These partitions can include one worker thread per core, one worker thread per socket, one worker thread per non-uniform memory access (NUMA) node, and one worker thread per machine. Accordingly, work items for a particular partition heap can be assigned to the worker thread that is assigned to the particular partition heap.

Each worker thread processes the work items in its corresponding queue to perform memory compaction. Each worker thread scans the partition heap identified in the work item to identify pages that exhibit low memory utilization. When a page is identified that exhibits low memory utilization, the worker thread can "move" the records in the page exhibiting low memory utilization into the active page. For example, worker thread 302 can create new versions of records $202b1$ and $202c1$ in active page $210a$, and worker thread 303 can create a new version of record $203c1$ in active page $210a$. Once new versions of the records have been created, the old versions can be marked accordingly to indicate that the record is no longer valid thereby causing the page to be emptied by a garbage collector to allow the page to be reclaimed.

To ensure that a page being processed by a worker thread does not become the active page, the worker thread can set a flag in the page header. This flag can be set to indicate that the page is under compaction. Any partially empty page could potentially be selected by a memory allocator as the active page. Accordingly, the flag is used by the worker threads to indicate to the corresponding memory allocator that a page under compaction should not be selected as the active page.

This flag can also be used to ensure that the memory compaction process does not interfere with the release of memory, or block or delay the garbage collection process. When the flag is set, and a free memory call is made on a block of memory in the page being processed, the block of memory to be freed is added to a linked list thus allowing the free memory call to return (without the block of memory being released). Accordingly, the memory compaction process does not cause the free call to block. Once the memory compaction process is completed, the worker thread checks the linked list to determine if any blocks of memory were added to the list during the compaction process. The worker thread then performs all the releases of the blocks of memory added to the linked list.

Multi-Version Concurrency Control Schemes

The relocation of records from one page to another can be performed in various well known, or other known manners. One manner, which employs a multi-version concurrency control scheme that uses transactions to create updated records, is disclosed in commonly owned co-pending application Ser. No. 13/042,269, titled EFFICIENT MULTI-VERSION LOCKING FOR MAIN MEMORY DATABASES, which is incorporated herein by reference in its entirety.

Another manner, which employs a multi-version concurrency control scheme that uses optimistic transactions to create updated records, is disclosed in commonly owned co-pending application Ser. No. 12/641,961, titled OPTIMISTIC SERIALIZABLE SNAPSHOT ISOLATION, which is incorporated herein by reference in its entirety. The memory compaction process of the present invention can use either of these multi-version concurrency control schemes, or any other appropriate multi-version concurrently control scheme, to create quasi-updated records in the active page. Quasi refers to the fact a new version of the record is created, but the user data contents of the new version is the same as the contents of the old version. In this manner, the impact on other transactions of relocating records during memory compaction is minimized. While the above disclosures relate to optimistic and pessimistic transactions, relocation of records by quasi-updates does not depend on whether transactions are optimistic or pessimistic. Rather any multiversioning scheme can be used where updates create completely new versions and do not update in place.

Illustratively, new versions of records can be created using a transaction for each record to be quasi-updated. For example, when the worker thread described above determines that a record is to be relocated, it can create a new transaction to relocate the record. Accordingly, in the following description, which is based on the disclosure of application Ser. Nos. 13/042,269 and 12/641,961 referenced above, the transaction created to relocate a record to the active page during the memory compaction process is an example of an updating transaction referred to as TU.

In one multi-version concurrency control scheme, a transaction is given two unique timestamps that indicate the logical time of its begin and end events, respectively. Timestamps define the overall ordering among transaction events. A timestamp as used herein may be a value received from a monotonically increasing counter and is not limited to a clock value.

For example, when a transaction begins, it can receive a timestamp by reading and incrementing a timestamp counter. This begin timestamp uniquely identifies the transaction and therefore in some embodiments can serve as the transaction id. When a transaction terminates, it can also receive an end timestamp by reading the timestamp counter and incrementing it. If the transaction terminates by committing, this end timestamp can also serve as its commit timestamp. This use of timestamps enables the multi-versioning scheme to preserve serializability among the concurrent transactions.

Records in the main memory database are versioned to allow for concurrent access by multiple transactions. Timestamps are also used to identify versions of records and their valid times. For example, a committed version of a record contains two timestamps, a start timestamp and an end timestamp. A transaction specifies a logical read time for every read which is normally equal to the transaction's begin timestamp. A version is visible to a transaction only if the read time falls within the version's valid time; all other versions are ignored.

The start timestamp of a committed version is equal to the commit time of the transaction that created the version. For example, if a transaction T1 creates a version of a record during its processing (such as by modifying an existing record or creating a new record), the created version will receive the same start timestamp as the transaction T1's commit timestamp. With respect to the memory compaction process of the present disclosure, when a record is relocated, the newly created record in the active page can receive the start timestamp of the transaction performing the relocation (i.e. a transaction created by the worker thread).

A version's end timestamp is initially set to a special value that indicates that the timestamp is not yet determined and is to be interpreted as infinity. However, when another transaction T2 commits a modification to the version (whether an update to the version that thus creates a new version, or a deletion of the version), the version's end timestamp is set to the commit timestamp of transaction T2. In other words, once T2 commits (thus making its new version of the record or deletion of the record durable), the previous version of the record is no longer the latest version. Once all currently active transactions have terminated the old version will become obsolete, that is, no longer visible to any transactions, and can be discarded.

Prior to T2 committing, the end timestamp of the version is set to T2's transaction ID because T2's commit time is not yet known. This same transaction ID is also initially used as the start timestamp of the new version for the same reason. Thus, when a transaction creates a new version, it assigns its transaction ID to the end timestamp of the version being modified, and the start timestamp of the new version. Once T2 commits, it writes its commit timestamp as the end timestamp of the old version and as the start timestamp of the new version. To distinguish between versions that contain a valid timestamp and those that have a temporary transaction ID assigned as its timestamp, a flag may be used.

With reference to the memory compaction process of the present disclosure, once the transaction that creates the updated record in the active page commits, the newly created record in the active page receives the commit timestamp of the transaction as its start timestamp while the version of the record that was relocated (i.e. the record in the page from which records are being relocated) receives the commit timestamp of the transaction as its end timestamp.

Because the old version of the record has an end timestamp that indicates that it is an "old" version (e.g. the end timestamp represents a time in the past with respect to a clock, or the end timestamp is a lower number than the current value of a monotonically increasing counter used for timestamps), it is known that the record is obsolete in the sense that it is no longer visible to any active or future transaction. In this way, once new versions of each record in a page subject to compaction are created in the active page, it can be determined that the page is empty (i.e., does not contain records, other than those that are obsolete), and can therefore be reclaimed (during garbage collection).

To summarize, in the memory compaction process of the present invention, a worker thread can create a transaction to relocate a record according to the multi-version concurrency control scheme described above. Specifically, the worker thread can use a separate transaction (e.g. TU as described above) to update each record. Accordingly, to "relocate" a record, in general, the worker thread obtains a write lock on the record, takes a wait for dependency if there are any read markers on the record, creates the new version of the record in the active page, and commits once any wait for dependencies (or commit dependencies) have been removed.

Figure 4:
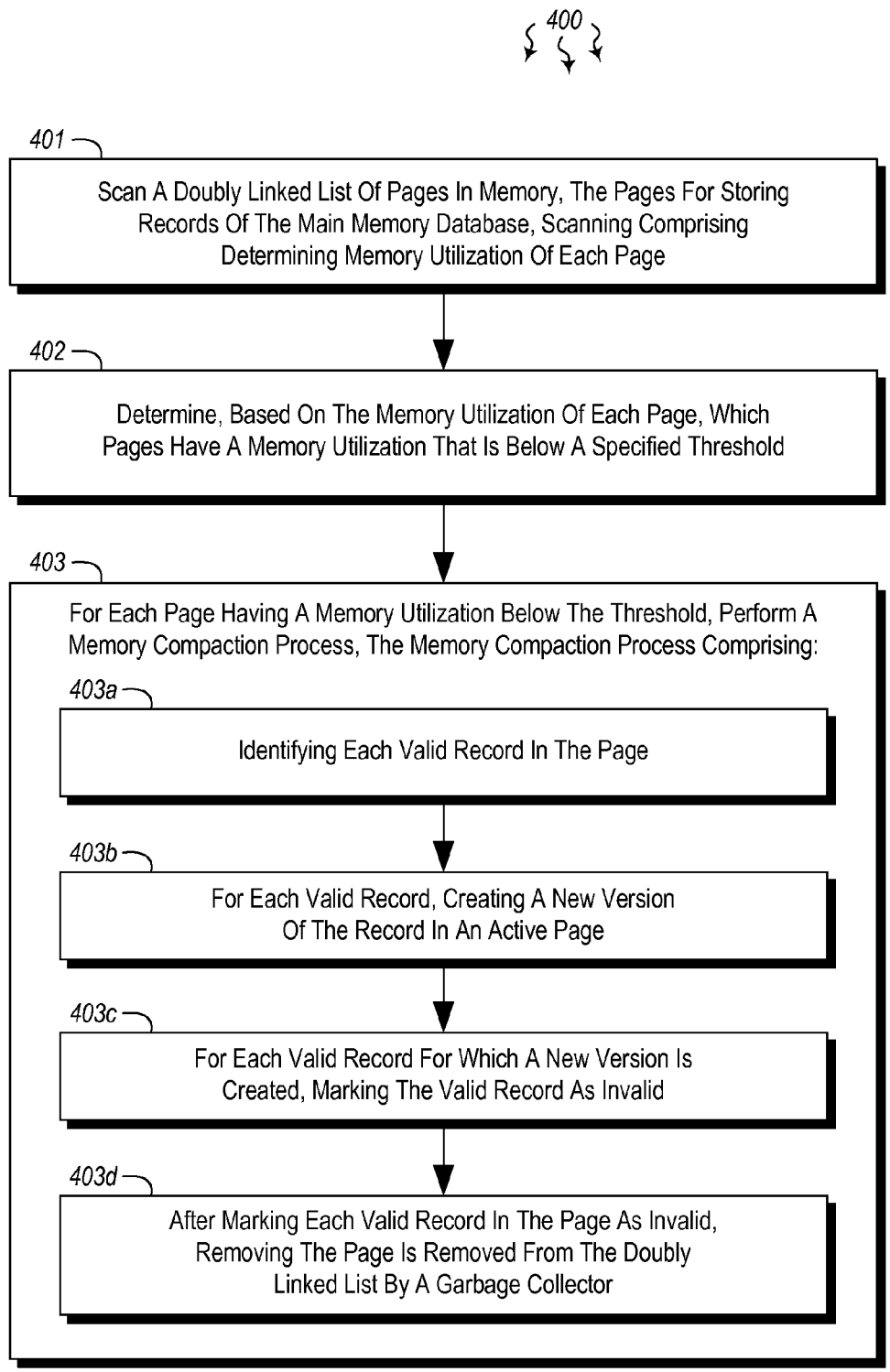
FIG. 4 illustrates a flowchart of an exemplary method for performing memory compaction in a main memory database.

FIG. 4 illustrates a flowchart of an exemplary method 400 for performing memory compaction in a main memory database. Method 400 will be described with reference to FIGS. 2B-2D and 3.

Method 400 includes an act 401 of scanning a doubly linked list of pages in memory. The pages store records of the main memory database. The scanning comprising determining memory utilization of each page. For example, each page in heap partition 202 can be scanned to determine the memory utilization of each page in partition heap 202. This scanning can be performed by a worker thread (e.g. worker thread 302)

in response to a work item being received from a main memory compaction thread (e.g. MC thread 301).

Method 400 includes an act 402 of determining, based on the memory utilization of each page, which pages have a memory utilization that is below a specified threshold. For example, if the specific threshold were two valid records, it could be determined that pages 202b and 202c in heap partition 202 exhibit a memory utilization below the specified threshold.

Method 400 includes an act 403 of, for each page having a memory utilization below the threshold, performing a memory compaction process. The memory compaction process can be performed by a worker thread assigned to the partition heap (e.g. worker thread 302 for partition heap 202).

The memory compaction process of act 403 includes sub-act 403a of identifying each valid record in the page. For example, for page 202b, valid record 202b1 can be identified, and for page 202c, valid record 202c1 can be identified. When a multi-version concurrency control scheme is implemented, this identification can be performed by reading an end timestamp of each record in the page. If the end timestamp of a record indicates that it is valid (e.g. if the end timestamp is infinity or some other value to indicate that the record is not "old"), the worker thread will determine that the record is valid.

The memory compaction process of act 403 includes sub-act 403b of, for each valid record, creating a new version of the record in an active page. For example, a new version 202b1-1 can be created in active page 210a for record 202b1, and a new version 202c1-1 can be created in active page 210a for record 202c1. These new versions can each be created using a separate transaction created by a worker thread. The separate transaction can be a pessimistic or optimistic transaction depending on the type of multi-version concurrency control scheme implemented in the database.

The memory compaction process of act 403 includes sub-act 403c of, for each valid record for which a new version is created, marking the valid record as invalid. For example, when a multi-version concurrency control scheme is implemented, an end timestamp of record 202b1 can be set to the commit timestamp of the transaction that created new version 202b1-1. This same commit timestamp can also be set as the start timestamp of new version 202b1-1 to indicate the start of new version 202b1-1's valid time.

This act of creating the new version, when a pessimistic transaction scheme is implemented, can include waiting to commit the transaction until any wait for dependencies have been removed. For example, if another transaction obtains a read marker on record 202b1 either before or while the updating transaction has a write lock on record 202b1, the updating transaction is forced to wait until these read markers are released before the updating transaction can commit (thereby making record 202b1-1 valid and record 202b1 invalid). Similarly, if another transaction reads record 202b1-1 during the updating transaction's pre-commit stage (thus giving the updating transaction a commit dependency), the updating transaction is required to notify the other transaction (i.e. decrement the other transaction's commit dependency count) when the updating transaction commits.

The memory compaction process of act 403 includes sub-act 403d of, after marking each valid record in the page as invalid, the page is removed from the doubly linked list, (e.g. by a garbage collector). For example, pages 202b and 202c can be removed from the doubly linked list of partition heap 202. Because a doubly linked list is used to organize the pages, the pointer to the next page in the list in page 202a can be updated to point to page 202d, while the pointer to the previous page in the list in page 202d can be updated to point to page 202a (as shown in FIG. 2C). Accordingly, because pages 202b and 202c have been emptied of all valid records (and because no other pages in the doubly linked list refer to these pages), pages 202b and 202c can be reclaimed through garbage collection.

Figure 5:
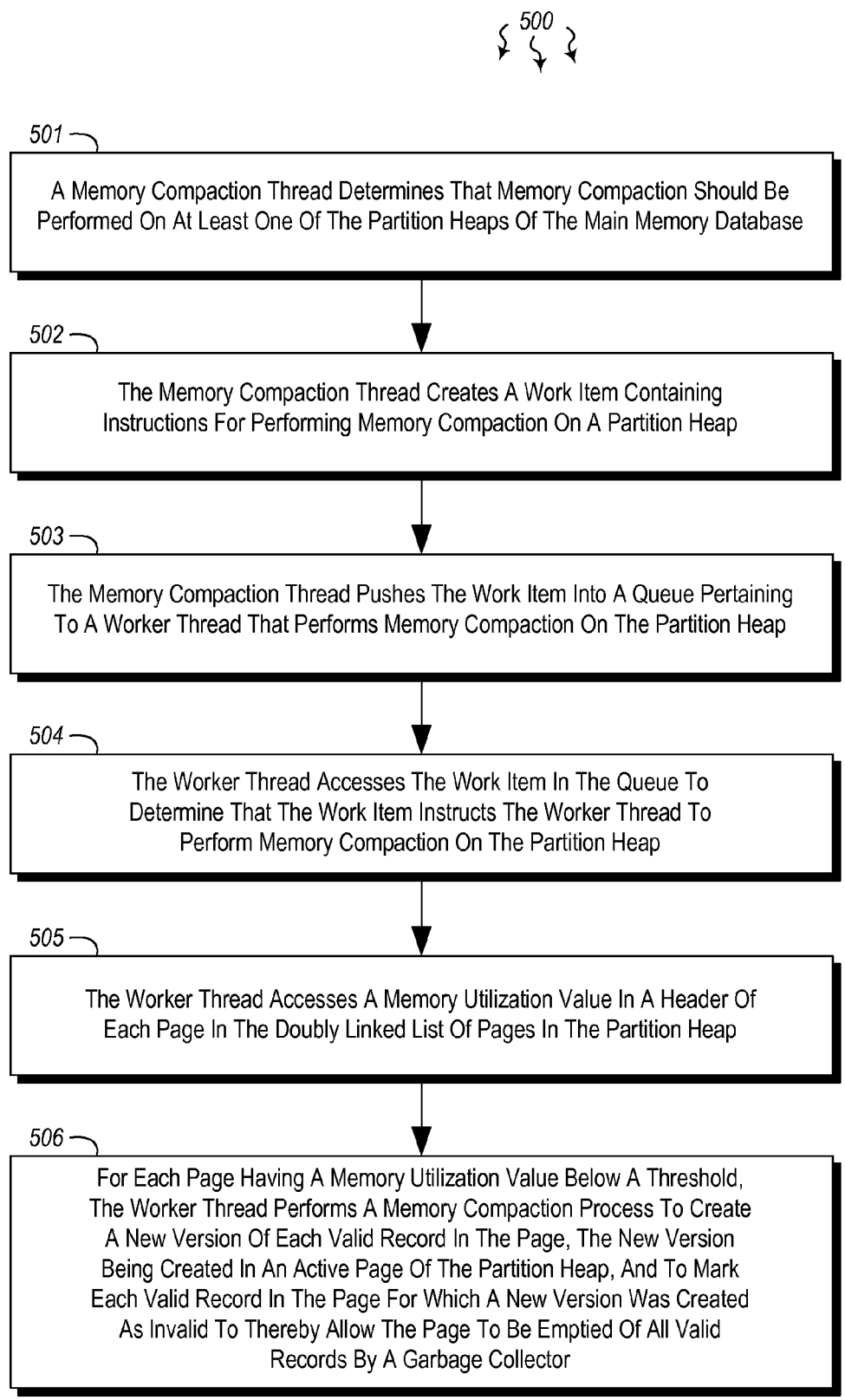
FIG. 5 illustrates a flowchart of another exemplary method for performing memory compaction in a main memory database.

FIG. 5 illustrates a flowchart of another exemplary method 500 for performing memory compaction in a main memory database. Method 500 will be described with reference to FIGS. 2B-2D and 3.

Method 500 includes an act 501 of a memory compaction thread determining that memory compaction should be performed on at least one of the partition heaps of the main memory database. For example, MC thread 301 can receive an automatic periodic request, or an on-demand request from a user or another process to initiate memory compaction. Alternatively, MC thread 301 can be configured to gather statistics regarding the memory utilization of the entire main memory database (or one or more tables of the main memory database), and determine based on the statistics whether memory compaction should be performed.

Method 500 includes an act 502 of the memory compaction thread creating a work item containing instructions for performing memory compaction on a partition heap. For example, MC thread 301 can create work item 310 which contains instructions for performing memory compaction on partition heap 202 of table 201.

Method 500 includes an act 503 of the memory compaction thread pushing the work item into a queue pertaining to a worker thread that performs memory compaction on the partition heap. For example, MC thread 301 can determine that worker thread 302 is tasked with performing memory compaction on partition heap 202, and can push work item 310 into queue 302a pertaining to worker thread 302.

Method 500 includes an act 504 of the worker thread accessing the work item in the queue to determine that the work item instructs the worker thread to perform memory compaction on the partition heap. For example, worker thread 302 can access work item 310 in queue 302a to determine that worker thread 302 is to perform memory compaction on partition heap 202.

Method 500 includes an act 505 of the worker thread accessing a memory utilization value in a header of each page in the doubly linked list of pages in the partition heap. For example, worker thread 302 can access a memory utilization value in the header of each page in partition heap 202 (e.g. pages 202a, 202b, 202c, etc.) which are arranged as a doubly linked list.

Method 500 includes an act 506 of, for each page having a memory utilization value below a threshold, the worker thread performing a memory compaction process to create a new version of each valid record in the page, the new version being created in an active page of the partition heap, and to mark each valid record in the page for which a new version was created as invalid to thereby empty the page of all valid records. For example, worker thread 302 can perform the memory compaction process on pages 202b and 202c including creating new versions 202b1-1 and 202c1-1 of records 202b1 and 202c1 respectively in active page 210a.

In some embodiments, the creation of the new version of each of the records can be performed by creating a transaction to create the new version using the techniques of a multi-version concurrency control scheme described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, performed by a computer system storing a main memory database, for performing memory compaction within the main memory database, the method comprising:
   scanning a doubly linked list of pages in memory, the pages for storing records of the main memory database, scanning comprising determining memory utilization of each page;
   determining, based on the memory utilization of each page, which pages have a memory utilization that is below a specified threshold;
   for each page having a memory utilization below the threshold, performing a memory compaction process, the memory compaction process comprising:
      identifying each valid record in the page;
      for each valid record, creating a new version of the valid record in an active page;
      for each valid record for which a new version is created, marking the valid record as invalid; and
      after marking each valid record in the page as invalid, the page being emptied and removed from the doubly linked list.

2. The method of claim 1, wherein the memory compaction process is performed using a pessimistic transaction which employs wait for dependencies to allow the old record to be read by other transactions while the pessimistic transaction creates and commits the new version of the record.

3. The method of claim 1, wherein scanning the doubly linked list of pages comprises reading the memory utilization of each page from a header of the page.

4. The method of claim 1, wherein the memory compaction process further includes setting a flag in a header of each page to be processed to indicate that the page is being emptied.

5. The method of claim 4, wherein the memory compaction process further comprises:
   after creating a new version of each record in the active page, accessing a list of blocks of memory in the page for which a free memory call was received while the flag was set; and
   releasing each block of memory in the list.

6. The method of claim 1, wherein the scanning is performed by a worker thread in response to receiving a work item.

7. The method of claim 1, wherein the doubly linked list includes all partially empty pages in a partition heap.

8. The method of claim 7, wherein the partition heap pertains to one of a table or a database.

9. The method of claim 1, wherein identifying a valid record comprises identifying a record having an end timestamp set to infinity, and marking a record as invalid comprises setting the end timestamp of the record to the commit timestamp of a transaction that created the new version of the record.

10. A computing system comprising one or more processors and system memory, wherein the system memory stores a main memory database being organized into partition heaps where each partition heap includes a plurality of pages that are structured in a doubly linked list, the main memory database including computer executable instructions for performing memory compaction within the main memory database, the computer executable instructions, when executed by the one or more processors, performing the following acts:
   scanning each page in a partition heap to determine the memory utilization of each page in the partition heap;
   determining, based on the memory utilization of each page, which pages have a memory utilization that is below a specified threshold;
   for each page having a memory utilization below the threshold, performing a memory compaction process, the memory compaction process comprising:
      identifying each valid record in the page;
      for each valid record, creating a new version of the valid record in an active page of the partition heap; and
      for each valid record for which a new version is created, marking the valid record as invalid to thereby allow the page to be emptied of all valid records to allow the page to be reclaimed.

11. The computing system of claim 10, wherein the computing system comprises a cloud.

12. The computing system of claim 10, wherein the computing system comprises a server.

13. The computing system of claim 10, wherein a worker thread, for each new version of a record to be created, creates a transaction to create the new version.

14. The computing system of claim 13, wherein the created transaction creates the new version of the record by:
   acquiring a write lock on the record for which the new version is to be created;
   creating the new version of the record in the active page;
   accessing a wait for count of the transaction; and
   if the wait for count indicates that the transaction has no wait for dependencies, the transaction committing, the committing including writing a commit timestamp as the end timestamp of the record, and writing the commit timestamp as the start timestamp of the new version of the record.

15. The computing system of claim 14, wherein if the wait for count indicates that the transaction has one or more wait for dependencies, the transaction waits to commit until each wait for dependency has been removed.

16. The computing system of claim 14, wherein committing includes pre-committing during which another transaction creates a commit dependency on the transaction prior to the transaction committing to thereby enable the other transaction to read the new version of the record prior to the transaction committing.

17. The computing system of claim 16, wherein the transaction waits to commit until the other transaction terminates and releases the commit dependency.

18. One or more computer-readable hardware storage device storing computer executable instructions which when executed by one or more processors perform acts for implementing memory compaction within a main memory database that stores records within pages that are organized as a doubly linked list within partition heaps, the acts comprising:
   a memory compaction thread determining that memory compaction should be performed on at least one of the partition heaps of the main memory database;
   the memory compaction thread creating a work item containing instructions for performing memory compaction on a partition heap;
   the memory compaction thread pushing the work item into a queue pertaining to a worker thread that performs memory compaction on the partition heap;
   the worker thread accessing the work item in the queue to determine that the work item instructs the worker thread to perform memory compaction on the partition heap;

the worker thread accessing a memory utilization value in a header of each page in the doubly linked list of pages in the partition heap; and for each page having a memory utilization value below a threshold, the worker thread performing a memory compaction process to create a new version of each valid record in the page, the new version being created in an active page of the partition heap, and to mark each valid record in the page for which a new version was created as invalid to thereby allow the page to be emptied of all valid records.

19. The One or more computer-readable hardware storage device of claim 18, wherein the acts further include:

the worker thread, after each valid record in the page has been marked as invalid, removing the page from the doubly linked list of pages of the partition heap.

20. The One or more computer-readable hardware storage device of claim 18, wherein the acts further include:

prior to performing the memory compaction process on a page, the worker thread setting a flag in the header of the page to indicate that the memory compaction process is being performed on the page, the flag preventing the page from becoming the active page in the partition heap.

* * * * *